United States Patent
Gonze et al.

(10) Patent No.: US 8,621,845 B2
(45) Date of Patent: Jan. 7, 2014

(54) PASSIVE SCR CONTROL SYSTEM AND METHOD

(75) Inventors: Eugene V. Gonze, Pinckney, MI (US); David B. Brown, Brighton, MI (US)

(73) Assignee: GM Global Technology Operations LLC

( * ) Notice: Subject to any disclaimer, the term of this patent is extended or adjusted under 35 U.S.C. 154(b) by 194 days.

(21) Appl. No.: 13/211,750

(22) Filed: Aug. 17, 2011

(65) Prior Publication Data

US 2013/0042597 A1 Feb. 21, 2013

(51) Int. Cl.
*F01N 3/00* (2006.01)

(52) U.S. Cl.
USPC ............... 60/285; 60/282; 60/286; 60/295; 60/300; 60/301

(58) Field of Classification Search
USPC ............... 60/282, 285, 295, 299, 300, 301
See application file for complete search history.

(56) References Cited

U.S. PATENT DOCUMENTS

| | | | |
|---|---|---|---|
| 6,345,496 B1 * | 2/2002 | Fuwa et al. .................. | 60/274 |
| 8,161,808 B2 | 4/2012 | Crawford et al. | |
| 8,201,443 B2 | 6/2012 | Wang et al. | |
| 8,250,913 B2 | 8/2012 | Lee et al. | |
| 2007/0044456 A1 * | 3/2007 | Upadhyay et al. ............. | 60/295 |
| 2008/0282686 A1 * | 11/2008 | Gonze et al. .................... | 60/300 |
| 2009/0293450 A1 * | 12/2009 | Gonze et al. .................... | 60/274 |
| 2010/0115926 A1 * | 5/2010 | Nagaoka et al. ............... | 60/286 |
| 2010/0139248 A1 * | 6/2010 | Najt et al. ....................... | 60/285 |
| 2010/0186390 A1 * | 7/2010 | Perry et al. .................... | 60/295 |
| 2011/0023456 A1 | 2/2011 | Levijoki et al. | |
| 2011/0061363 A1 | 3/2011 | Levijoki et al. | |
| 2011/0061372 A1 | 3/2011 | Levijoki et al. | |

OTHER PUBLICATIONS

U.S. Appl. No. 12/855,196, filed Aug. 12, 2010, Brett B. Thompson.

* cited by examiner

*Primary Examiner* — Thomas E. Denion
*Assistant Examiner* — Philip Eklem (57) ABSTRACT

A thermal management system includes an enable module, a status module and a temperature control module. The enable module enables generation of ammonia for use in selective catalytic reduction (SCR) catalysts of an exhaust system during a passive SCR mode. The status module determines whether the exhaust system is operating in a passive SCR mode and generates a passive SCR active signal. The passive SCR mode includes operating an engine with rich air/fuel ratios. The temperature control module activates electrical heating of an oxidation catalyst based on the passive SCR active signal and a temperature of the oxidation catalyst.

20 Claims, 5 Drawing Sheets

PASSIVE SCR CONTROL SYSTEM AND METHOD

FIELD

The present disclosure relates to vehicle exhaust systems, and more particularly to thermal management systems that maintain active temperatures of exhaust components.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During a combustion cycle of an internal combustion engine (ICE), air/fuel mixtures are provided in cylinders of the ICE. The air/fuel mixtures are compressed and combusted to provide output torque. After combustion, pistons of the ICE force exhaust gases in the cylinders out through exhaust valve openings and into an exhaust system. The exhaust gases may contain nitrogen oxides ($NO_x$), carbon monoxide (CO) and hydrocarbons (HCs).

An exhaust gas treatment system of the ICE may include a catalytic converter and a selective catalytic reduction (SCR) catalyst to reduce exhaust emissions. As an example, a thee-way catalyst converter (TWC) may be used to reduce $NO_x$, CO2 and HCs within an exhaust system. The TWC converts $NO_x$ to nitrogen and oxygen, CO to carbon dioxide and oxidizes unburnt HCs to produce carbon dioxide and water. The SCR catalyst may be located downstream from the TWC and may further reduce $NO_x$ in the exhaust system. A SCR catalyst converts $NO_x$ into nitrogen $N_2$ and water $H_2O$.

SUMMARY

A thermal management system is provided and includes an enable module, a status module and a temperature control module. The enable module enables generation of ammonia for use in selective catalytic reduction (SCR) catalysts of an exhaust system during a passive SCR mode. The status module determines whether the exhaust system is operating in a passive SCR mode and generates a passive SCR active signal. The passive SCR mode includes operating an engine with rich air/fuel ratios. The temperature control module activates electrical heating of an oxidation catalyst based on the passive SCR active signal and a temperature of the oxidation catalyst.

In other features, a thermal management method is provided and includes enabling generation of ammonia for use in selective catalytic reduction (SCR) catalysts of an exhaust system during a passive SCR mode. The method further includes determining whether the exhaust system is operating in a passive SCR mode and a passive SCR active signal is generated. The passive SCR mode includes operating an engine with rich air/fuel ratios. Electrical heating of an oxidation catalyst is activated based on the passive SCR active signal and a temperature of the oxidation catalyst.

Further areas of applicability of the present disclosure will become apparent from the detailed description provided hereinafter. It should be understood that the detailed description and specific examples are intended for purposes of illustration only and are not intended to limit the scope of the disclosure.

DRAWINGS

The present disclosure will become more fully understood from the detailed description and the accompanying drawings, wherein.

DETAILED DESCRIPTION

An internal combustion engine (ICE) may be operated with a lean air/fuel ratio to minimize fuel consumption and improve operating efficiency of the ICE. The leaner the ICE is operated, the less fuel consumed and the more efficient the ICE operates. An exhaust gas treatment system of the ICE may include a catalytic converter and cascaded selective catalytic reduction (SCR) catalysts to reduce exhaust emissions. The SCR catalysts may be located downstream from the TWC and reduce $NO_x$ in the exhaust system.

Ammonia stored in the SCR catalysts reduces $NO_x$ in the exhaust system. The ammonia stored in the SCR catalysts may be provided by operating the exhaust system in a passive SCR mode. During the passive SCR mode, an ICE is operated with a rich mixture or an air/fuel ratio that is less than a stoichiometric ratio (e.g., less than 14.7:1). During rich exhaust operating conditions, the catalytic converter may convert NOx to nitrogen and produces ammonia and carbon monoxide (CO). The ammonia is stored by the SCR catalysts and is used by the SCR catalysts during lean exhaust conditions to convert $NO_x$ to nitrogen and oxygen. The ammonia is provided to the SCR catalysts without the use of a urea dosing circuit. This minimizes system components.

As stored ammonia in a SCR catalyst may be released as the SCR temperatures rise when the first SCR temperatures exceeds 400° C., the cascaded SCR catalysts (multiple serially connected SCR catalysts) are used instead of a single SCR catalyst. This can occur in engine exhaust systems with large temperature differential profiles. The use of multiple SCR catalysts prevents ammonia from reaching oxidation catalysts downstream from the SCR catalysts. The closer a SCR catalyst is to the ICE, the greater the temperature of the SCR catalyst. Ammonia released by an upstream SCR catalyst that is at a temperature greater than 400° C. may be absorbed by a downstream catalyst that is at a temperature less than 400° C.

An oxidation catalyst may be incorporated downstream from the cascaded SCR catalysts to oxidize the CO produced during the passive SCR mode. An average light-off temperature (activation temperature) at which an oxidation catalyst typically begins to function is approximately 200-350° C. An oxidation catalyst inserted into an exhaust system upstream of a SCR catalyst may convert ammonia into $NO_x$. As the oxidation catalyst is located a substantial distance from the ICE, the temperature of the oxidation catalyst can decrease to a temperature that is less than the activation temperature. This can occur during the passive SCR mode and/or during light load operating conditions (e.g., city driving). As a result, the oxidation catalyst may not oxidize the CO produced.

Implementations disclosed below maintain the oxidation catalysts at an active temperature while operating in a passive SCR mode.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, tasks, operations, elements, and/or components, but do not preclude the presence or addition of one or more other features, tasks, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, and/or devices, these elements, components, and/or devices should not be limited by these terms. These terms may be only used to distinguish one element, component, or device from another element, component, or device. Terms such as "first," "second," and other numerical terms when used herein do not imply a sequence or order unless clearly indicated by the context. Thus, a first element, component, or device discussed below could be termed a second element, component, or device without departing from the teachings of the example embodiments.

Figure 1:
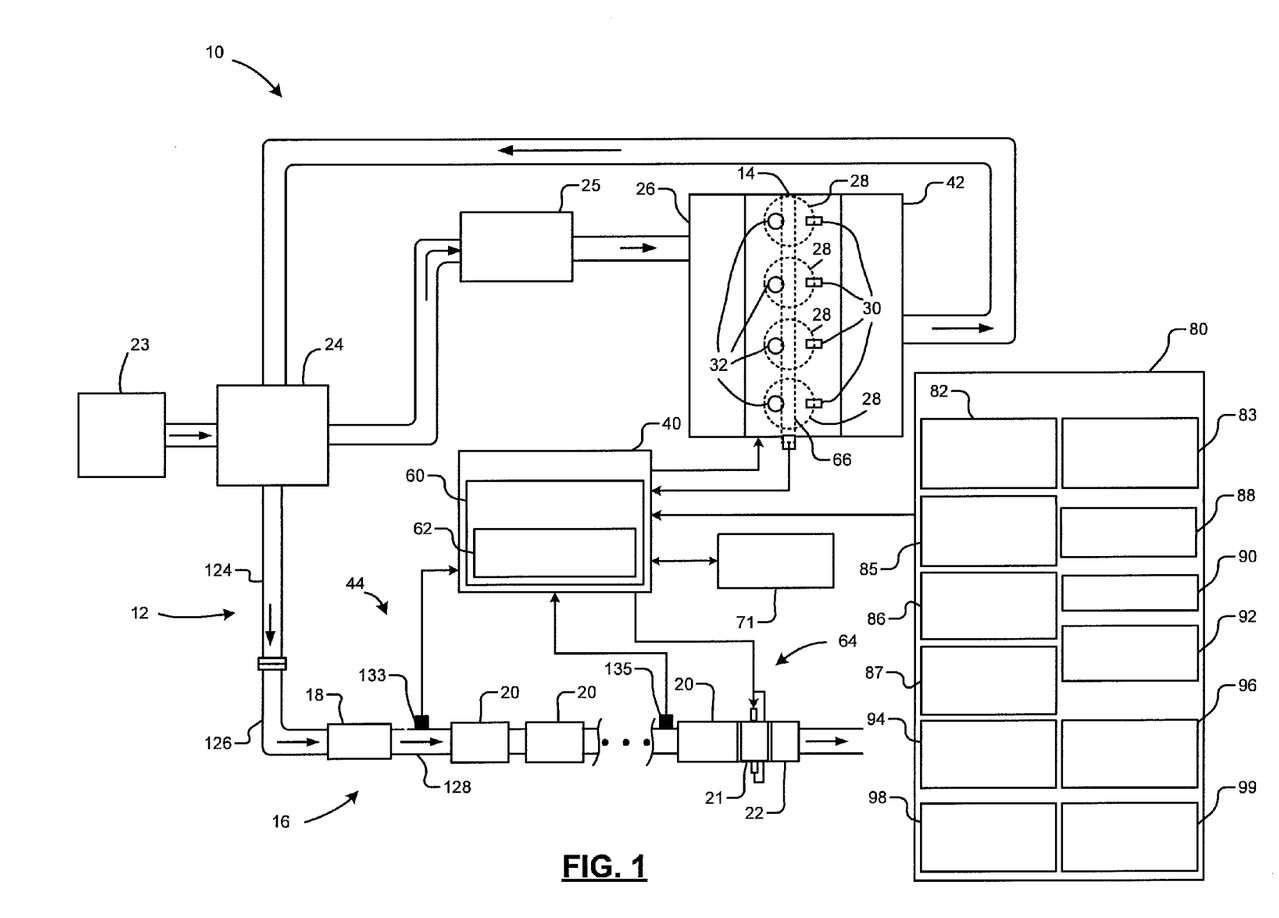
FIG. 1 a functional block diagram of an engine system incorporating a thermal management system in accordance with the present disclosure.
Figure 2:
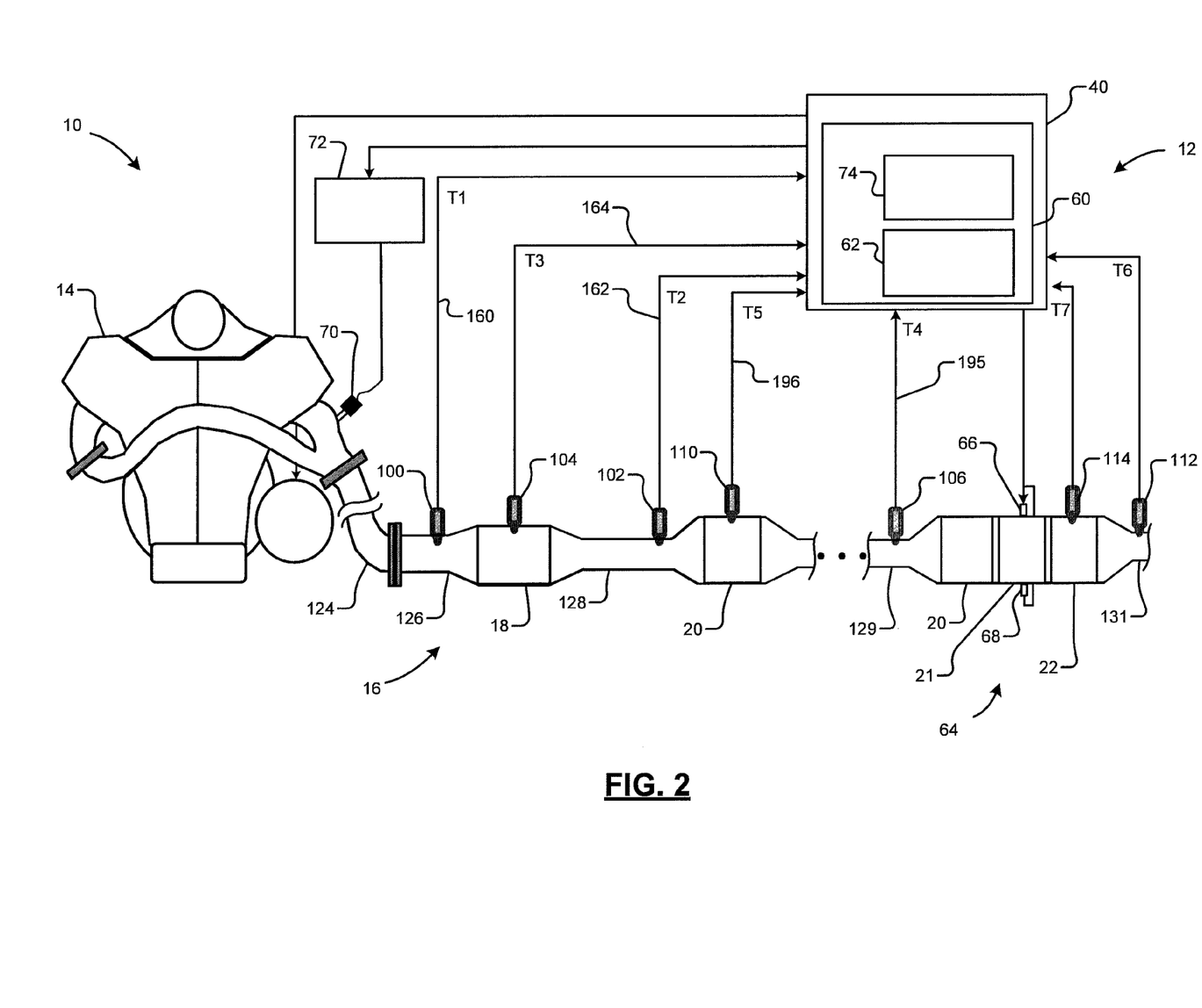
FIG. 2 is a functional block diagram of the thermal management system of FIG. 1.

In FIGS. 1 and 2, an engine system 10 and a thermal management system 12 are shown. The engine system 10 is a low emissions vehicle system that includes the thermal management system 12 and an engine 14 with an exhaust system 16. The exhaust system 16 includes a catalytic converter (CC) 18, cascaded selective catalytic reduction (SCR) catalysts 20, and one or more oxidation catalysts (two oxidation catalysts 21, 22 are shown). In the example shown, the oxidation catalysts include an electrically heated oxidation catalyst (EHC) 21 and a non-electrically heated or passive oxidation catalyst (OXI) 22. Although the oxidation catalysts 21 are shown downstream from the SCR catalysts 20, the oxidation catalysts 21 may be in a different location relative to the SCR catalysts 20 (e.g., upstream from or between the SCR catalysts 20). The thermal management system 12 maintains temperatures of the CC 18, the cascaded SCR catalysts 20 and the oxidation catalysts above respective light-off and/or minimum active operating temperatures.

The temperatures of the CC 18 and the cascaded SCR catalysts 20 are maintained while permitting the engine 14 to operate with pre-combustion lean air and fuel (air/fuel) ratios. The temperatures of the oxidation catalysts are maintained while operating in a passive SCR mode. During the passive SCR mode, ammonia in the cascaded SCR catalysts 20 is replenished. To replenish the ammonia, the engine 14 may be operated with rich air/fuel ratios (i.e. ratios less than a stoichiometric ratio (e.g., 14.7:1)) for a predetermined period of time, until NOx levels are below predetermined thresholds, and/or periodically. As an alternative and/or in addition to operating the engine 14 with rich air/fuel ratios, post fuel injection may be performed, and/or fuel may be injected into the exhaust system 16. The CC 18 converts fuel in the exhaust to produce ammonia and CO. The ammonia is absorbed by the cascaded SCR catalysts 20. The oxidation catalysts when activated oxidize the excess produced CO.

Temperatures of the engine 14 and/or portions of the exhaust system 16 (other than the CC 18 and the cascaded SCR catalysts 20) may decrease to temperatures less than the light-off and/or minimum active operating temperatures when the engine 14 is operating with lean air/fuel ratios. Lean engine operation and reduced engine operating temperatures reduces heat losses and improves fuel economy. Temperatures of the exhaust system 16 (other than the oxidation catalysts) may decrease to temperatures less than a light-off or minimum active operating temperature when operating in the passive SCR mode.

The engine system 10 includes the engine 14 that combusts an air/fuel mixture to produce drive torque. Although the engine system 10 is shown as a spark ignition direct injection engine, the engine system 10 is provided as an example. The thermal management system 12 may be implemented on various other engine systems, such as stratified engine systems, port fuel injection systems, homogeneous charge compression ignition (HCCI) engine systems, etc. Stratified engine systems may refer to direct injection engine systems where fuel is ignited upon entering cylinders of an engine.

During operation, air enters the engine 14 by passing through an air filter 23 and may be drawn into a turbocharger 24. The turbocharger 24 when included compresses the fresh air. The greater the compression, the greater the output of the engine 14. The compressed air passes through an air cooler 25 when included before entering an intake manifold 26. Air within the intake manifold 26 is distributed into cylinders 28. Fuel may be directly injected into the cylinders 28 by fuel injectors 30. Spark plugs 32 ignite air/fuel mixtures in the cylinders 28. Combustion of the air/fuel mixtures creates exhaust. The exhaust exits the cylinders 28 into the exhaust system 16.

The thermal management system 12 includes the exhaust system 16 and an engine control module (ECM) 40. The exhaust system 16 includes the CC 18, the cascaded SCR catalysts 20, the oxidation catalysts, the ECM 40, and an exhaust manifold 42. In the example shown, the exhaust system 16 includes in the following order: the exhaust manifold 42, a first exhaust conduit 124, a second exhaust conduit 126, the CC 18, a third exhaust conduit 128, the cascaded SCR catalysts 20, the oxidation catalysts (e.g., the oxidation catalysts 21, 22), and a fourth exhaust conduit 131.

As an example, the CC 18 may include a three-way catalyst (TWC). The CC 18 may reduce nitrogen oxides NOx, oxidizes carbon monoxide (CO) and oxidizes unburnt hydrocarbons (HC) and volatile organic compounds. The CC 18 oxidizes the exhaust based on a post combustion air/fuel ratio in the exhaust system 16. The amount of oxidation increases the temperature of the exhaust. The cascaded SCR catalysts 20 are used to further reduce $NO_x$ via ammonia absorbed into the cascaded SCR catalysts 20. The cascaded SCR catalysts 20 convert $NO_x$ into nitrogen $N_2$ and water $H_2O$.

Optionally, an EGR valve (not shown) re-circulates a portion of the exhaust back into the intake manifold 26. The remainder of the exhaust is directed into the turbocharger 24 to drive a turbine. The turbine facilitates the compression of the fresh air received from the air filter 23. Exhaust flows from the turbocharger 24 to the CC 18.

The thermal management system 12 may operate in various modes including the passive SCR mode, an oxidation catalyst heating mode, a CC heating mode, a SCR heating mode, a lean operating mode (or temperature maintaining mode), etc. The modes may be initiated and controlled via the ECM 40, a thermal control module 60, and/or a passive SCR control module 62. The thermal control module 60 and the passive SCR control module 62 may be incorporated as part of the ECM 40. The thermal control module 60 may include the passive SCR control module 62. The control modules 60, 62 are part of the thermal management system 12 and are further described below with respect to FIGS. 3-5.

During the passive SCR mode, ammonia is produced to regenerate the cascaded SCR catalysts 20. During certain operating conditions, temperatures of the oxidation catalysts (e.g., the oxidation catalysts 21, 22) may decrease below a predetermined oxidation threshold $THR_{OXI}$. The certain conditions may include operating under light loads, such as in city driving. Thermal energy generated by the engine 14 is reduced during light load conditions, which can cause the temperatures of the oxidation catalysts to decrease to temperatures below a minimum active operating temperature. The passive SCR control module 62 activates the oxidation catalyst heating mode to heat at least one of the oxidation catalysts to maintain the oxidation catalysts at least at the minimum active operating temperature.

One or more of the oxidation catalysts (e.g., the EHC 21) may be electrically heated via a heating circuit 64. The heating circuit 64 supplements heating of the oxidation catalysts provided by the exhaust system 16. As an example, the heating circuit 64 may be connected to and heat the most upstream one of the oxidation catalysts (e.g., the electrically heated catalyst (EHC) 21). The other oxidation catalysts (e.g., the oxidation catalyst OXI 22) may be heated due to heated exhaust passing through the most upstream one of the oxidation catalysts and/or radiant heat transfer from the EHC 21. The EHC 21 receives a selected current and/or a selected voltage from the catalyst heating circuit 64.

The catalyst heating circuit 64 includes one or more terminals. In the example shown, two terminals are provided; a supply terminal 66 and a ground or return terminal 68. In the example shown, the EHC 21 may perform as a resistive element between the terminals 66, 68 and receive current from the supply terminal 66. Temperature of the EHC 21 increases while current is supplied to the supply terminal 66. This allows the EHC 21 to increase to a functioning or active temperature (e.g., a catalyst light off temperature). Different voltage levels may be applied to the terminals 66, 68, such as 12V-42V. Voltage levels greater than 42V may be used. Power supplied to the terminals 66, 68 may be from a power source that includes hybrid vehicle batteries, plug-in type batteries, and/or lithium-ion batteries.

The minimum active operating temperature and/or the maintained temperature of the oxidation catalysts may be 200-350° C. For example, the minimum operating temperature and/or the maintained temperature may be 250° C. The predetermined oxidation threshold $THR_{OXI}$ may be greater than or equal to a minimum active operating temperature of the oxidation catalysts.

During the CC heating mode, the CC 18 is heated to at least a CC light-off temperature (e.g., 200-350° C.). In one implementation, the CC 18 is heated to at least 250° C. The ECM 40 and/or the thermal control module 60 may set the pre-combustion air/fuel ratio of the engine 14 to a stoichiometric ratio while retarding spark to heat the CC 18. This allows heat from the engine 14 to be transferred into the exhaust system 16 and heat the CC 18. Spark timing may be delayed from, for example, a spark time associated with top-dead-center (TDC) and/or a currently set spark time to retard spark. The currently set spark time may be prior to or subsequent to TDC.

During the SCR heating mode, the cascaded SCR catalysts 20 are heated to at least an active temperature (e.g., 200-350° C.). In one implementation, the cascaded SCR catalysts 20 are heated to at least 225° C. The ECM 40 and/or the thermal control module 60 may perform post fuel injection and/or inject fuel into the exhaust system 16 to heat the cascaded SCR catalysts 20. Post fuel injection may include injecting fuel into the cylinders 28 subsequent to ignition of air/fuel mixtures in the cylinders 28 and prior to intake strokes of the cylinders 28. This allows fuel to be passed into the exhaust system 16. A hydrocarbon (HC) injector 70 (shown in FIG. 2) may be used to inject fuel directly into the exhaust system 16. The thermal control module 60 may signal a fuel pump 72 to supply fuel to the HC injector 70. The HC injector 70 may inject fuel into the exhaust system 16, for example, between the engine 14 and the CC 18, as shown.

The fuel provided to the exhaust system 16 via post fuel injection and/or via the HC injector 70 may be ignited in, for example, the CC 18. Thermal energy generated by the ignition of the fuel heats the cascaded SCR catalysts 20. The post fuel injection and/or injection via the HC injector 70 may be controlled by a post injection control module 74 of the thermal control module 60. The SCR heating mode may not be performed while the CC heating mode is performed.

During the lean operating mode, the ECM 40 and/or the thermal control module 60 operates the engine 14 with pre-combustion lean air/fuel ratios. The CC heating mode, the SCR heating mode and/or the oxidation catalyst heating mode may not be performed while the lean operating mode is performed.

The ECM 40, the thermal control module 60 and/or the passive SCR control module 62 may control the engine system 10 and the thermal management system 12 based on sensor information. The sensor information may be obtained directly via sensors and/or indirectly via algorithms, models and/or tables stored in memory 71. Some example sensors 80 for determining exhaust flow levels, exhaust temperature levels, exhaust pressure levels, catalyst temperatures, oxygen levels, intake air flow rates, intake air pressure, intake air temperature, vehicle speed, engine speed, EGR, etc are shown. Exhaust flow sensors 82, exhaust temperature sensors 83, exhaust pressure sensors 85, catalyst temperature sensors 86, an ambient temperature sensor 87, an oxygen sensor 88, an EGR sensor 90, an intake air flow sensor 92, an intake air pressure sensor 94, an intake air temperature sensor 96, vehicle speed sensor 98 and an engine speed sensor 99 are shown.

A first exhaust flow, pressure and/or temperature sensor 100 may be connected to the second exhaust conduit 126 and upstream from the CC 18. A second exhaust flow, pressure and/or temperature sensor 102 may be connected to the third exhaust conduit 128 downstream from the CC 18. A first catalyst temperature sensor 104 may be connected to the CC 18. A third exhaust flow, pressure and/or temperature sensor 106 may be connected to a fourth exhaust conduit 129 downstream from one or more of the cascaded SCR catalysts 20. One or more catalyst temperature sensors may be connected to the cascaded SCR catalysts 20 and to the oxidation catalysts. As one example, a second catalyst temperature sensor 110 is shown and is connected to one of the cascaded SCR catalysts 20.

A fourth exhaust flow, pressure and/or temperature sensor 112 may be connected to a fifth exhaust conduit 131. A third catalyst temperature sensor 114 may be connected to, for example, one of the oxidation catalysts. The third catalyst temperature sensor 114 may be connected to the most downstream one of the oxidation catalysts.

A first $NO_x$ sensor 133 may be connected to the second exhaust conduit 128. A second $NO_x$ sensor 135 may be connected to the fourth exhaust conduit 131. Any number of $NO_x$ sensors may be incorporated into the exhaust system 16. The NOx sensors detect NOx levels within the exhaust system 16. The $NO_x$ sensors may be in different locations than that shown for the sensors 133, 135. The ECM 40, the thermal control module 60 and/or the passive SCR control module 62 may control operation of the thermal control system 12 and the engine 14 based on the information from the sensors 80, 100, 102, 104, 106, 110, 112, 114, 133 and 135.

Figure 3:
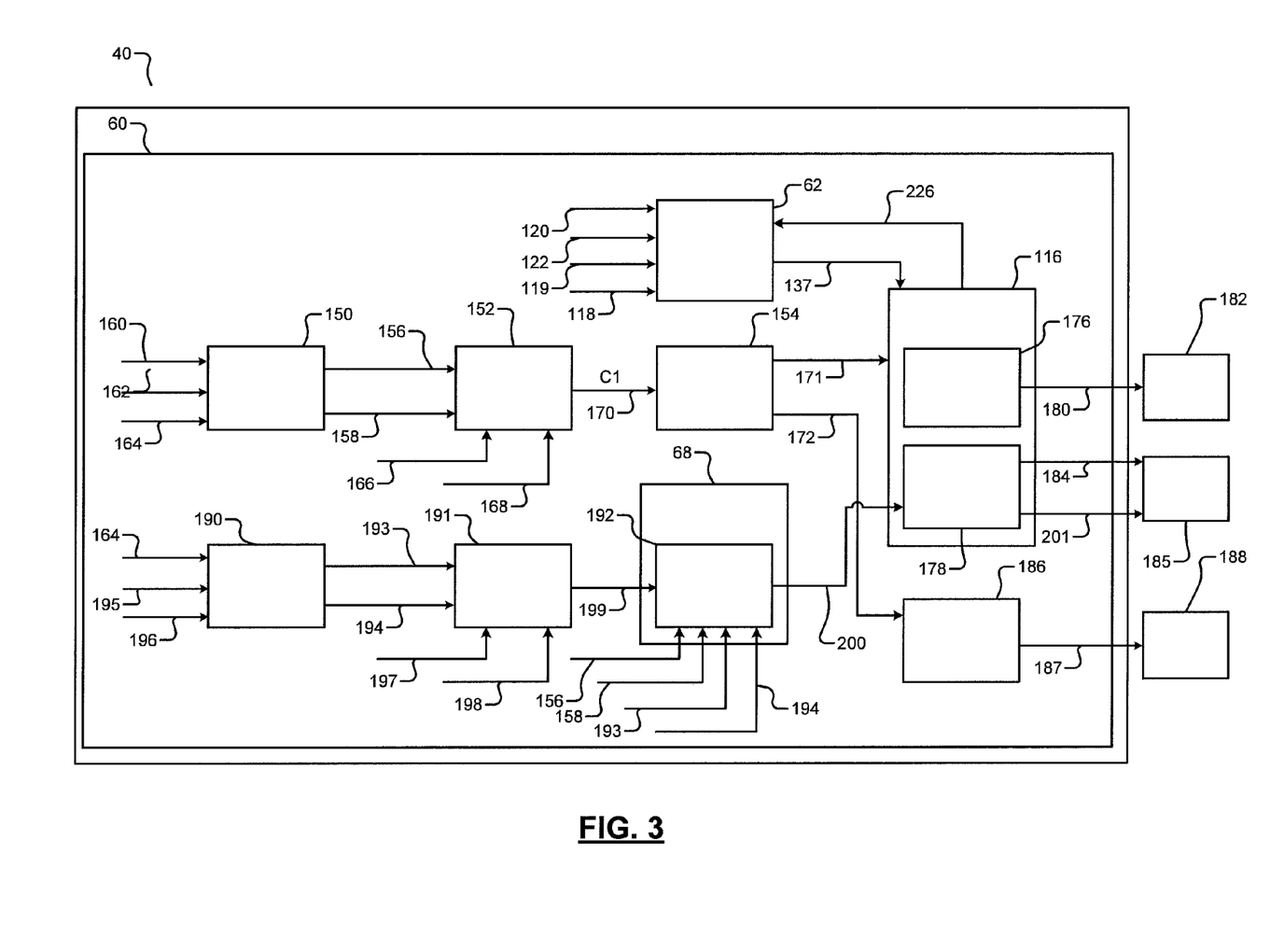
FIG. 3 is a functional block diagram of an engine control module incorporating a thermal control module in accordance with the present disclosure.

Referring now also to FIG. 3, the ECM 40 including the thermal control module 60 is shown. The thermal control module 60 includes the passive SCR control module 62 and an air/fuel ratio control module 116. The passive SCR control module 62 may activate the passive SCR mode and/or the oxidation heating mode based on one or more sensor signals and/or an air/fuel ratio signal. The sensor signals may include at least, for example, temperature signals T2 and T4-T7 (118, 119) from the sensors 102, 106, 110, 112, 114 and the nitrogen signals $NO_{x1}$, $NO_{x2}$ (120, 122) from the sensors 133, 135. The passive SCR control module 62 may generate a passive SCR mode request signal REQ (137) to enable and/or activate the passive SCR mode.

The air/fuel ratio control module 116 controls air/fuel ratios of the engine 14 and may generate the air/fuel ratio signal, which may indicate a current air/fuel ratio and/or operation in the rich mode, the lean mode and/or the stoich mode. The air/fuel ratio control module 116 may control the air/fuel ratios of the engine 14 based on the passive SCR mode request signal REQ. The passive SCR control module 62 is further described with respect to FIGS. 4 and 5.

The thermal control module 60 may also include a CC temperature monitoring module 150, a CC comparison module 152 and a CC temperature control module 154. The CC temperature monitoring module 150 may determine an operating and/or average temperature (CC temperature) $T_{CC}$ (156) and/or an active volume $CC_{AV}$ (158) of the CC 18. The active volume $CC_{AV}$ refers to the volume of the CC 18 that is active (i.e. has a temperature that is greater than a light-off temperature). The CC temperature $T_{CC}$ and/or an active volume $CC_{AV}$ may be determined based on, for example, temperature signals T1-T3 (160-164) from the sensors 100, 102, 104, an engine model, an algorithm, etc.

As an example, the CC temperature monitoring module 150 may estimate the CC temperature $T_{CC}$ and/or the active volume $CC_{AV}$ using a first thermal model and based on engine parameters and/or exhaust temperatures, some of which are described below with respect to equations 1 and 2. The CC temperature monitoring module may directly determine the CC temperature $T_{CC}$ via the sensors 100, 102, 104. The first thermal model may include equations, such as equations 1 and 2.

$$T_{CC} = f\left\{ \begin{array}{l} F_{CCRate}, S_{ENG}, CC_{Mass}, CC_{IMP}, T_{EXH}, DC, \\ E_{RunTime}, E_{Load}, T_{AMB}, CAM, SPK \end{array} \right\} \quad (1)$$

$$CC_{AV} = f\left\{ \begin{array}{l} T_{CC}, F_{CCRate}, S_{ENG}, CC_{Mass}, CC_{IMP}, T_{EXH}, DC, \\ E_{RunTime}, E_{Load}, T_{AMB}, CAM, SPK \end{array} \right\} \quad (2)$$

$F_{CCRate}$ is exhaust flow rate through the CC 18, which may be a function of mass air flow and fuel quantity supplied to the cylinders 28. The mass air flow may be determined by a mass air flow sensor, such as the intake air flow sensor 92. $S_{ENG}$ is speed of the engine 14 (i.e. rotational speed of a crankshaft of the engine 14). DC is duty cycle of the engine 14. $CC_{Mass}$ is mass of the CC 18. $CC_{IMP}$ is resistance or impedance of the CC 18. $E_{RunTime}$ is time that the engine 14 is activated (ON). $E_{Load}$ is current load on the engine 14. $T_{EXH}$ may refer to a temperature of the exhaust system 16, and based on one or more of the sensors 100, 102, 104. $T_{amb}$ is ambient temperature. CAM is cam phasing of the engine 14. SPK is spark timing. The CC temperature $T_{CC}$ and/or the active volume $CC_{AV}$ may be based on one or more of the engine system parameters provided in equations 1 and 2 and/or other engine system parameters.

The CC comparison module 152 compares the CC temperature $T_{CC}$ to a catalyst light-off temperature $T_{LO}$ (166) and/or the active volume $CC_{AV}$ to a first catalyst threshold $CC_{THR}$ (168). The catalyst light-off temperature $T_{LO}$ and the first catalyst threshold $CC_{THR}$ may be predetermined and stored in the memory 71. The CC comparison module 152 generates a first comparison signal C1 (170) that indicates whether the CC temperature $T_{CC}$ is greater than the catalyst light-off temperature $T_{LO}$ and/or whether the active volume $CC_{AV}$ is greater than the first catalyst threshold $CC_{THR}$.

The CC temperature control module 154 determines whether to operate in the CC heating mode based on the first comparison signal C1. The CC temperature control module 154 may operate in the CC heating mode when the CC temperature $T_{CC}$ is less than the catalyst light-off temperature $T_{LO}$ and/or when the active volume $CC_{AV}$ is less than the first catalyst threshold $CC_{THR}$. The CC temperature control module 154 may generate and/or adjust a stoichiometric signal STOICH (171) and/or a retard spark signal RET (172) to request that the engine 14 operate with stoichiometric air/fuel ratios and that spark timing of the engine 14 be retarded.

The stoichiometric signal STOICH may be provided to an air/fuel ratio control module 104. The air/fuel ratio control module 104 includes an air control module 176 and a fuel control module 178. The air control module 176 generates an air control signal THR (180) based on the stoichiometric signal STOICH. The air control signal THR may be provided to, for example, a throttle actuator module 182 to control a position of a throttle plate and adjust the amount of air supplied to the cylinders 28. The fuel control module 178 generates a fuel control signal FUEL (184) based on the stoichiometric signal STOICH. The fuel control signal FUEL may be provided to a fuel actuator module 185 to adjust the amount of fuel supplied to the cylinders 28. The fuel actuator module 185 may control operation of the fuel injectors 30.

Each system that varies an engine parameter may be referred to as an actuator that receives an actuator value. For example, the throttle actuator module 182 may be referred to as an actuator and the throttle opening area may be referred to as the actuator value. The throttle actuator module 182 may achieve a throttle opening area by adjusting an angle of a blade of a throttle valve. The throttle actuator module 182 may monitor the position of the throttle valve using one or more throttle position sensors (not shown). The air control module 176 may output a desired area signal to the throttle actuator module 182 based on the stoichiometric signal STOICH. The throttle actuator module 182 then regulates the throttle valve to produce the desired throttle area.

The retard spark signal RET may be provided to a spark control module 186, which may generate a spark control (or timing) signal SPARK (187) based on the retard spark signal RET. The spark control signal SPARK may be provided to a spark actuator module 188. The spark actuator module 188 may be referred to as an actuator, while a corresponding actuator value may be the amount of spark retard relative to cylinder TDC and/or a current spark time of a cylinder. The spark actuator module 188 controls operation of the spark plugs 32.

The thermal control module 60 further includes a SCR temperature monitoring module 190, a SCR comparison module 191 and a SCR temperature control module 192. The SCR temperature monitoring module 190 may determine an operating and/or average temperature (SCR temperature) $T_{SCR}$ (193) and/or an active volume $SCR_{AV}$ (194) of the cascaded SCR catalysts 20. The active volume $SCR_{AV}$ refers to the volume of the cascaded SCR catalysts 20 that is active (i.e. has a temperature that is greater than a light-off temperature). The SCR temperature $T_{SCR}$ and/or an active volume $SCR_{AV}$ may be determined based on, for example, temperature signals T3-T5 (164, 195, 196) from the sensors 102, 106, 110 an engine model, an algorithm, etc.

As an example, the SCR temperature monitoring module 190 may estimate the SCR temperature $T_{SCR}$ and/or the active volume $SCR_{AV}$ using a second thermal model and based on engine parameters and/or exhaust temperatures, some of which are described below with respect to equations 3 and 4. The SCR temperature monitoring module 190 may directly determine the SCR temperature $T_{SCR}$ via the sensors 102, 106, 110. The second thermal model may include equations, such as equations 3 and 4.

$$T_{SCR} = f\left\{\begin{array}{l} F_{SCRRate}, S_{ENG}, SCR_{Mass}, SCR_{IMP}, T_{EXH}, DC, \\ E_{RunTime}, E_{Load}, T_{AMB}, CAM, SPK \end{array}\right\} \quad (3)$$

$$CC_{AV} = f\left\{\begin{array}{l} T_{SCR}, F_{SCRRate}, S_{ENG}, SCR_{Mass}, SCR_{IMP}, T_{EXH}, DC, \\ E_{RunTime}, E_{Load}, T_{AMB}, CAM, SPK \end{array}\right\} \quad (4)$$

$F_{SCRRate}$ is exhaust flow rate through the cascaded SCR catalysts 20, which may be a function of mass air flow and fuel quantity supplied to the cylinders 28. $SCR_{Mass}$ is mass of the cascaded SCR catalysts 20. $SCR_{IMP}$ is resistance or impedance of the cascaded SCR catalysts 20. $T_{EXH}$ may refer to a temperature of the exhaust system 16, and based on one or more of the sensors 102, 106, 110. The SCR temperature $T_{SCR}$ and/or the active volume $SCR_{AV}$ may be based on one or more of the engine system parameters provided in equations 3 and 4 and/or other engine system parameters.

The SCR comparison module 191 compares the SCR temperature TscR to an active temperature $T_{ACT}$ (197) and/or the active volume $SCR_{AV}$ (198) to a second catalyst threshold $SCR_{THR}$. The active temperature $T_{ACT}$ and/or the active volume $SCR_{AV}$ may be predetermined and stored in the memory 71. The SCR comparison module 191 generates a second comparison signal C2 (199) that indicates whether the SCR temperature $T_{SCR}$ is greater than the active temperature $T_{ACT}$ and/or whether the active volume $SCR_{AV}$ is greater than the second catalyst threshold $SCR_{THR}$.

The SCR temperature control module 192 may be part of the post injection control module 68 and determines whether to operate in the SCR heating mode based on the second comparison signal C2. The SCR temperature control module 192 may operate in the SCR heating mode when the SCR temperature $T_{SCR}$ is less than the active temperature $T_{ACT}$ and/or when the active volume $SCR_{AV}$ is less than the second catalyst threshold $SCR_{THR}$. The SCR temperature control module 192 may generate and/or adjust a post injection signal POST (200) to request that the engine 14 perform post injection and/or that the HC injector 70 inject fuel directly into the exhaust system 16.

The post injection signal POST may be provided to the air/fuel ratio control module 104 and/or the fuel control module 178. The fuel control module 178 generates the fuel control signal FUEL based on the post injection signal POST. The fuel control signal FUEL and/or a HC injection signal HCINJ (201) may be provided to the fuel actuator module to adjust the amount of fuel provided to the exhaust system 16.

The amount of fuel provided to the exhaust system 16 during post fuel injection and/or by the HC injector 70 may be limited based on and/or as a function of the CC temperature $T_{CC}$, the SCR temperature $T_{SCR}$, and/or the active volumes $CC_{AV}$, $SCR_{AV}$. This provides closed-loop control of fuel injected into the exhaust system 16.

As another example, the SCR temperature $T_{SCR}$ may be determined based on a temperature gradient across the cascaded SCR catalysts 20. The CC temperature monitoring module 150 determines a temperature gradient across the cascaded SCR catalysts 20 based on the temperature signals T1, T2 from the temperature sensors 102, 106. For example, the CC temperature monitoring module 150 may determine a difference between the first temperature signal T1 and the second temperature signal T2, as provided by equation 5.

$$GRAD = T1 - T2 \quad (5)$$

A weighted average value WA may be generated as a function of the temperature signals T1, T2. As an alternative, the weighted average value WA may be a weighted average of the temperature signals T1, T2. An example of the weighted average value WA is provided by equation 6, where x is a calibrated value between 0 and 1. The calibrated value x may be calibrated based on, for example, thermocouple data of tested and/or modeled catalysts.

$$WA = [(x)T1 + (1-x)T2] \quad (6)$$

The weighted average value WA indicates an average temperature of the cascaded SCR catalysts 20. The active volume $SCR_{AV}$ of the cascaded SCR catalysts 20 may be determined based on the temperature signals T1, T2, the weighted average value WA, and/or other parameters. The active volume $SCR_{AV}$ of the cascaded SCR catalysts 20 may be determined based on, for example, mass, resistance and/or impedance of the cascaded SCR catalysts 20, ambient temperature, engine speed, camshaft phasing, ignition timing, duty cycle of the engine, etc., as described above.

A temperature gradient across the CC 18 may also be determined to determine the CC temperature $T_{cc}$ using sensors 100 and 102. The active volume $CC_{AV}$ of the CC 18 may be determined based on the temperature signals of the sensors 100, 102, the weighted average value determined therefrom, and/or other parameters (some of which are stated above).

Figure 4:
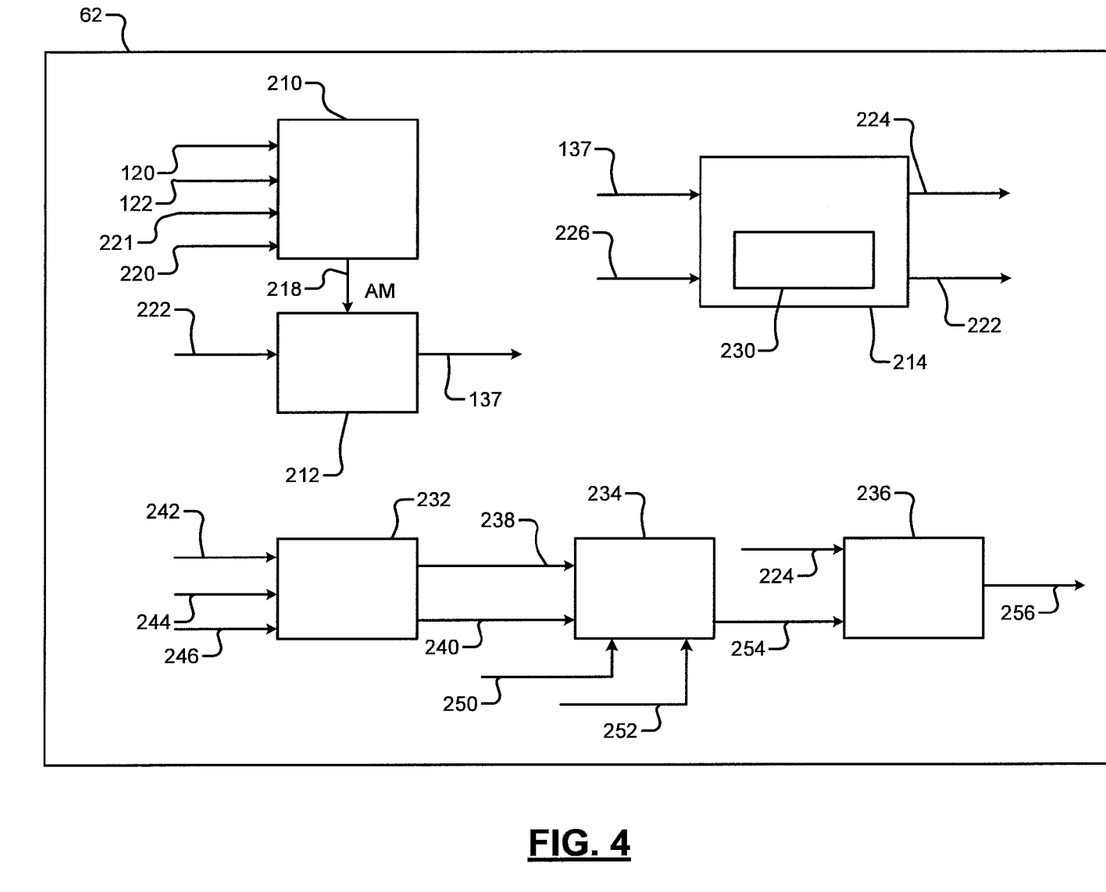
FIG. 4 is a functional block diagram of a passive SCR control module in accordance with the present disclosure.

Referring now also to FIG. 4, the passive SCR control module 62 is shown. The passive SCR control module 62 may include an ammonia monitoring module 210, a passive SCR enable module 212, and a passive SCR status module 214. The ammonia monitoring module 210 estimates ammonia storage states of the cascaded SCR catalysts 20. The ammonia storage states refer to amounts of ammonia stored in each of the cascaded SCR catalysts 20. The ammonia monitoring module 210 estimates the ammonia storage states and generates an ammonia status signal AM (218) based on one or more of the $NO_x$ signals (e.g., $NO_{x1}$, $NO_{x2}$) and/or one or more of the temperature signals T2, T4, T5 (220). The ammonia monitoring module 210 in determining the ammonia storage states may compare the $NO_x$ signals and/or an average of the $NO_x$ signals to one or more $NO_x$ thresholds (e.g., the nitrogen threshold $THR_{NOx}$ (221)). The ammonia status signal AM 218 may indicate ammonia levels in the cascaded SCR catalysts 20, whether the $NO_x$ thresholds have been exceeded, etc. The $NO_x$ thresholds may be stored in the memory 71.

The passive SCR enable module 212 may generate the passive SCR request signal REQ based on the ammonia status signal AM and/or a time signal TIME (222). The time signal TIME may indicate an amount of time that the passive SCR mode has been active. The passive SCR status module 214 may generate a passive SCR active signal $SCR_{ACT}$ (224) base on the passive SCR request signal REQ and the air/fuel ratio signal NF (226). The passive SCR status module 214 may monitor when the air/fuel ratio is rich and the passive SCR mode is enabled to determine time in the passive SCR mode. The passive SCR status module 214 may include a timer 230 that tracks time in the passive SCR mode. This tracked time may be indicated via the time signal TIME.

The passive SCR control module 62 may further include an oxidation catalyst (oxi-cat) temperature monitoring module 232, an oxi-cat comparison module 234 and an oxi-cat temperature control module 236. The oxi-cat temperature monitoring module 232 may determine an operating and/or average temperature (oxi-cat temperature) $T_{OXI}$ (238) and/or an active volume $OXI_{AV}$ (240) of the one or more oxidation catalysts (e.g., the oxidation catalysts 21, 22). The active volume $OXI_{AV}$ refers to the volume of the one or more oxidation catalysts that is active (i.e. has a temperature that is greater than a light-off temperature or minimum active operating temperature). The oxi-cat temperature $T_{OXI}$ and/or an active volume $OXI_{AV}$ may be determined based on, for example, temperature signals T4, T6, T7 (242, 244, 246) from the sensors 106, 112, 114, an engine model, an algorithm, etc.

As an example, the oxi-cat temperature monitoring module 232 may estimate the oxi-cat temperature $T_{OXI}$ and/or the active volume $OXI_{AV}$ using a third thermal model and based on engine parameters and/or exhaust temperatures, some of which are described below with respect to equations 7 and 8. The oxi-cat temperature monitoring module 232 may determine the oxi-cat temperature $T_{OXI}$ via the sensors 106, 112, 114. The third thermal model may include equations, such as equations 7 and 8.

$$T_{OXI} = f \left\{ \begin{array}{l} F_{CCRate}, S_{ENG}, OXI_{Mass}, OXI_{IMP}, T_{EXH}, DC, \\ E_{RunTime}, E_{Load}, T_{AMB}, CAM, SPK \end{array} \right\} \quad (7)$$

$$OXI_{AV} = f \left\{ \begin{array}{l} T_{CC}, F_{CCRate}, S_{ENG}, OXI_{Mass}, OXI_{IMP}, T_{EXH}, DC, \\ E_{RunTime}, E_{Load}, T_{AMB}, CAM, SPK \end{array} \right\} \quad (8)$$

$F_{CCRate}$ may be exhaust flow rate through the oxidation catalysts, which may be a function of mass air flow and fuel quantity supplied to the cylinders 28. The mass air flow may be determined by a mass air flow sensor, such as the intake air flow sensor 92. $OXI_{Mass}$ is mass of the oxidation catalysts. $OXI_{IMP}$ is resistance or impedance of the oxidation catalysts. $T_{EXH}$ may refer to a temperature of the exhaust system 16, and based on one or more of the sensors 106, 112, 114. The oxi-cat temperature $T_{OXI}$ and/or the active volume $OXI_{AV}$ may be based on one or more of the engine system parameters provided in equations 7 and 8 and/or other engine system parameters.

As another example, the oxi-cat temperature $T_{OXI}$ may be determined based on a temperature gradient across the oxidation catalysts (e.g., the oxidation catalysts 21, 22). The CC temperature monitoring module 150 determines a temperature gradient across the oxidation catalysts based on the temperature signals T4, T6 from the temperature sensors 106, 112. For example, the oxi-cat temperature monitoring module 232 may determine a difference between the first temperature signal T4 and the second temperature signal T6, as provided by equation 9.

$$GRAD = T4 - T6 \quad (9)$$

A weighted average value WA may be generated as a function of the temperature signals T4, T6. As an alternative, the weighted average value WA may be a weighted average of the temperature signals T4, T6. An example of the weighted average value WA is provided by equation 10, where x is a calibrated value between 0 and 1. The calibrated value x may be calibrated based on, for example, thermocouple data of tested and/or modeled catalysts.

$$WA = [(x)T4(1-x)T6] \quad (10)$$

The weighted average value WA indicates an average temperature of the oxidation catalysts. The active volume $OXI_{AV}$ of the oxidation catalysts may be determined based on the temperature signals T4, T6, the weighted average value WA, and/or other parameters. The active volume $OXI_{AV}$ of the oxidation catalysts may be determined based on, for example, mass, resistance and/or impedance of the oxidation catalysts, ambient temperature, engine speed, camshaft phasing, ignition timing, duty cycle of the engine, etc., as described above.

The oxi-cat comparison module 234 may compare the oxi-cat temperature $T_{OXI}$ to a catalyst light-off temperature (e.g., the threshold $THR_{OXI}$ (250)) and/or the active volume $OXI_{AV}$ to a catalyst threshold $AV_{THR}$ (252). The catalyst light-off temperature $THR_{OXI}$ and the catalyst threshold $AV_{THR}$ may be predetermined and stored in the memory 71. The oxi-cat comparison module 234 generates a third comparison signal C3 (254) that indicates whether the oxi-cat temperature $T_{OXI}$ is greater than the catalyst light-off temperature $THR_{OXI}$ and/or whether the active volume $OXI_{AV}$ is greater than the catalyst threshold $AV_{THR}$.

The oxi-cat temperature control module 236 determines whether to operate in the oxidation catalyst heating mode based on the third comparison signal C3. The oxi-cat temperature control module 236 may operate in the oxidation catalyst heating mode when the oxi-cat temperature $T_{OXI}$ is less than the catalyst light-off temperature $THR_{OXI}$ and/or when the active volume $OXI_{AV}$ is less than the catalyst threshold $OXI_{THR}$. The oxi-cat temperature control module 236 generates an oxi-cat activation signal OXIACT (256) to activate electrical heating of one or more of the oxidation catalysts.

Figure 5:
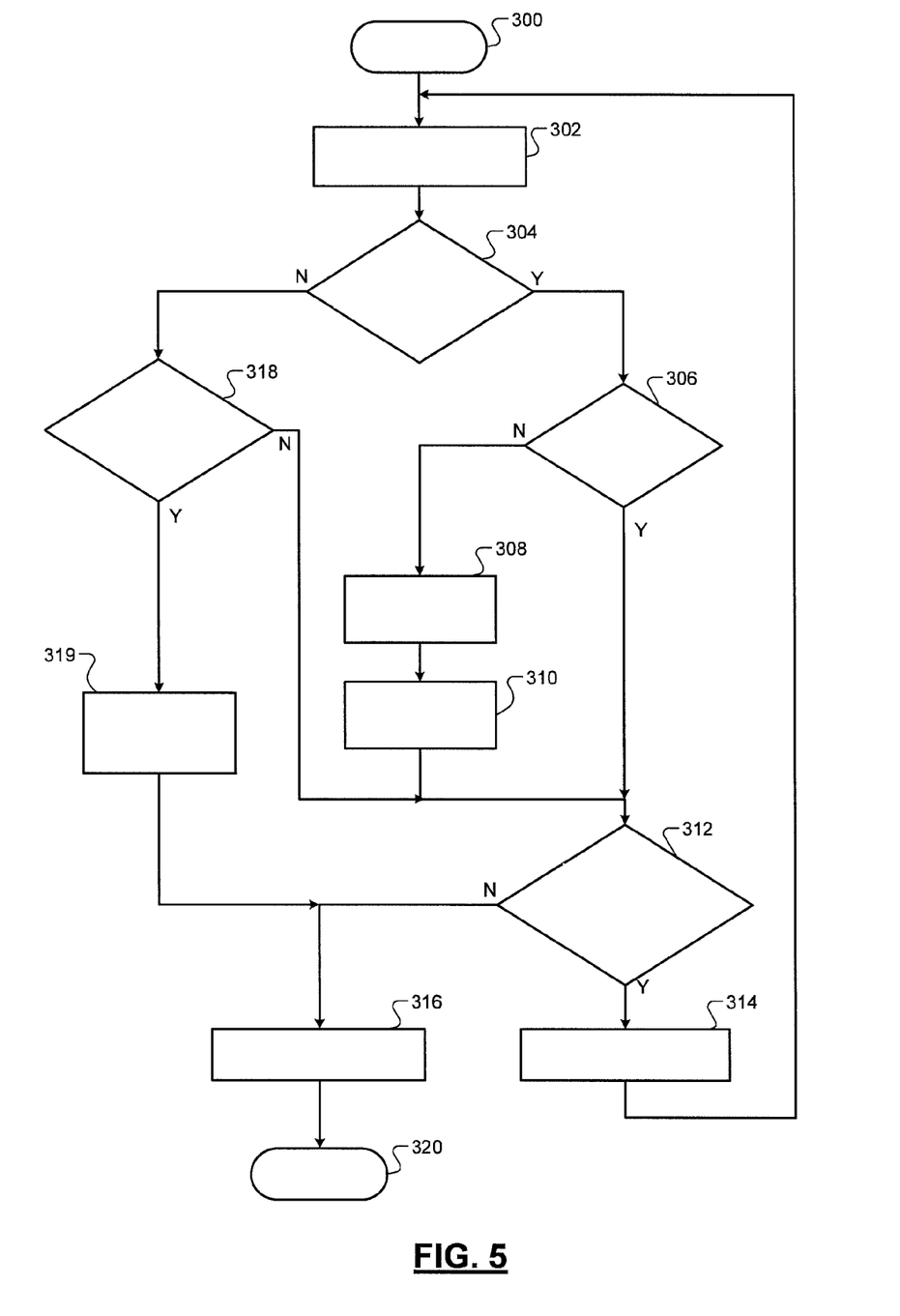
FIG. 5 is a logic flow diagram of a thermal control method in accordance with the present disclosure.

The thermal management system 12 may be operated using numerous methods, an example method is provided by the method of FIG. 5. In FIG. 5, a thermal control method is shown. Although the following tasks are primarily described with respect to the implementations of FIGS. 1-4, the tasks may be easily modified to apply to other implementations of the present disclosure. The tasks may be iteratively performed. The method may begin at 300.

At 302, sensor signals are generated. For example, the sensors 80, 100, 102, 104, 106, 110, 112, 114, 133, 135 may generate respective sensor signals.

At 304, the ammonia monitoring module 210 determines whether to generate ammonia for use in the cascaded SCR catalysts 20. The ammonia monitoring module 210 may base this decision on ammonia levels in the cascaded SCRs and/or NOx levels in the exhaust system. The ammonia monitoring module 210 may estimate the levels of ammonia in the cascaded SCR catalysts 20 based on one or more of the sensor signals generated at 302. The NOx levels may be determined based on sensor signals from the $NO_x$ sensors 133, 135 and/or directly and/or indirectly based on sensor signals from other sensors (e.g., the sensors 80, 100, 102, 104, 106, 110, 112, 114) of the thermal management system 12. The ammonia monitoring module 210 compares the estimated ammonia levels and/or the determined $NO_x$ levels with predetermined thresholds and generates the ammonia status signal AM.

At 306, the passive SCR status module 214 determines whether the passive SCR mode is active. The passive SCR status module 214 may determine whether the passive SCR mode is active based on the passive SCR mode request signal REQ and/or an air/fuel ratio signal NF generated by the air/fuel ratio control module 116. Task 308 is performed when the passive SCR mode is not active, otherwise task 312 is performed.

At 308, the passive SCR enable module 212 enables (or initiates) the passive SCR mode based on the ammonia status signal AM. The passive SCR mode may be enabled by setting a passive SCR flag and/or by generating the passive SCR mode request signal REQ.

At 310, air/fuel ratio control module 116 adjusts air/fuel ratios of the engine 14 to operate in the rich mode. The thermal control module 60 is operating in the passive SCR mode when the rich mode is active and/or when the air/fuel ratio control module 116 is iteratively switching between the rich mode and the stoich mode or the lean mode within a predetermined period of time. The passive SCR status module 214 may start the timer 230 to monitor time in the passive SCR mode and/or initiate decrementing a timer when the passive SCR mode is activated.

During the passive SCR mode, the engine 14 may be iteratively switched between operating with rich air/fuel ratios (rich mode) and operating with either stoichiometric air/fuel ratios (stoich mode) or lean air/fuel ratios (lean mode). A lean air/fuel ratio may refer to an air/fuel ratio that is greater than a stoichiometric air/fuel ratio (e.g., 14.7:1). The iterative activation and deactivation of the rich mode allows oxygen to mix with fuel in the exhaust system to allow the oxidation catalysts (e.g., the EHC 21 and the OXI 22) to oxidize the CO generated during the passive SCR mode.

At 312, the oxi-cat comparison module 234 determines whether the oxi-cat temperature $T_{OXI}$ is less than the threshold $THR_{OXI}$ and/or a catalyst light-off temperature (or within a predetermined temperature range) and/or whether the active volume $OXI_{AV}$ is less than the catalyst threshold $AV_{THR}$. Task 314 is performed when the OXI temperature $T_{OXI}$ is less than the threshold $THR_{OXI}$ and/or the catalyst light-off temperature (or within the predetermined temperature range) and/or when the active volume $OXI_{AV}$ is less than the catalyst threshold $AV_{THR}$, otherwise task 316 is performed.

At 314, the oxi-cat temperature control module 236 increases and maintains temperatures of the oxidation catalysts (e.g., the EHC 21 and the OXI 22) above light-off and/or minimum active operating temperatures during at least the passive SCR mode. The oxi-cat temperature control module 236 may increase the temperature of the oxidation catalysts to temperatures for CO oxidation. The oxi-cat temperature control module 236 may generate the oxi-cat activation signal OXIACT to activate electrical heating of one or more of the oxidation catalysts, as described above. The temperatures of the oxidation catalysts may be adjusted based on sensor signals from one or more of, for example, the sensors 100, 102, 106, 112, 114 and/or from other sensors of the thermal management system 12. The oxi-cat temperature control module 236 may maintain electrical heating of the oxidation catalysts until temperatures of the oxidation catalysts are maintained above the light-off and/or minimum active operating temperatures via heat transfer from the exhaust.

At 316, the oxi-cat temperature control module 236 may deactivate electrical heating of the oxidation catalyst(s). The thermal control module 60 may return to task 302 upon completing task 316 or may end at 320, as shown.

At 318, the passive SCR enable module 212 may compare the time of the timer and/or the time signal TIME to a predetermined period. Task 319 may be performed when the time exceeds the predetermined period and/or when the time decreases to 0.

At 319, the passive SCR enable module 212 may disable the passive SCR mode. The passive SCR enable module 212 may change status of the flag set at 308 and/or the passive SCR mode request signal REQ. The air/fuel ratio control module 116 may deactivate the rich mode and return to operating in one or more of the lean and stoich modes. The timer 230 may be reset at 319. The thermal control module 60 may proceed to task 316 upon completing task 319.

The above-described tasks are meant to be illustrative examples; the tasks may be performed sequentially, synchronously, simultaneously, continuously, during overlapping time periods or in a different order depending upon the application. Also, one or more of the tasks may not be performed. For example, task 318 may not be performed.

The above-described implementations allow for CO emission standards to be satisfied, allow for lean fuel operation to be maximized, and utilize a minimal electrical power to supplement heating of exhaust system catalysts. Lean fuel operation tends to decrease exhaust system temperatures. As the catalysts are maintained at temperatures greater than light-off or minimum active operating temperature, lean fuel operation is maximized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermal management system comprising:
   an enable module that enables generation of ammonia for use in selective catalytic reduction (SCR) catalysts of an exhaust system during a passive SCR mode;
   a status module that determines whether the exhaust system is operating in a passive SCR mode and generates a passive SCR active signal, wherein the passive SCR mode includes operating an engine with rich air/fuel ratios, and wherein the passive SCR active signal indicates whether the exhaust system is operating in the passive SCR mode; and
   a temperature control module that activates electrical heating of an oxidation catalyst downstream from the SCR catalysts based on the passive SCR active signal and a temperature of the oxidation catalyst,
   wherein the temperature control module performs the activation of the electrical heating of the oxidation catalyst to increase the temperature of the oxidation catalyst to a temperature greater than or equal to a light-off temperature of the oxidation catalyst.

2. The thermal management system of claim 1, further comprising an ammonia monitoring module that determines levels of nitrogen oxides ($NO_x$) within the exhaust system and generates an ammonia status signal based on the $NO_x$ levels,
   wherein the enable module enables the passive SCR mode based on the ammonia status signal.

3. The thermal management system of claim 1, further comprising an ammonia monitoring module that estimates ammonia levels within the SCR catalysts and generates an ammonia status signal based on the ammonia levels,
   wherein the enable module enables the passive SCR mode based on the ammonia status signal.

4. The thermal management system of claim 1, further comprising an air/fuel ratio control module that generates ammonia in the exhaust system by operating the engine with the rich air/fuel ratios based on an enable signal,
   wherein the enable module generates the enable signal based on at least one of $NO_x$ levels within the exhaust system and ammonia levels within the SCR catalysts.

5. The thermal management system of claim 4, wherein the air/fuel ratio control module switches between operating in a rich mode and operating in one of a lean mode and a stoichiometric mode when the passive SCR mode is active.

6. The thermal management system of claim 4, wherein the air/fuel ratio control module switches between operating in a rich mode and operating in one of a lean mode and a stoichiometric mode within a predetermined period and while the passive SCR mode is active.

7. The thermal management system of claim 1, further comprising:
   a temperature monitoring module that determines the temperature of the oxidation catalyst; and
   a comparison module that compares the temperature of the oxidation catalyst with a predetermined threshold and generates a comparison signal,
   wherein the temperature control module activates electrical heating of the oxidation catalyst based on the comparison signal.

8. The thermal management system of claim 1, further comprising:
   a temperature monitoring module that determines an active volume of the oxidation catalyst; and
   a comparison module that compares the active volume of the oxidation catalyst with a predetermined threshold and generates a comparison signal,
   wherein the temperature control module activates electrical heating of the oxidation catalyst based on the comparison signal.

9. The thermal management system of claim 1, wherein the temperature control module activates electrical heating of the oxidation catalyst when the passive SCR mode is active and the temperature of the oxidation catalyst is less than a predetermined threshold.

10. An engine system comprising:
    the thermal management system of claim 1;
    a $NO_x$ sensor that detects a level of $NO_x$ in the exhaust system; and
    a temperature sensor that detects the temperature of the oxidation catalyst,
    wherein the enable module enables the passive SCR mode based on the level of $NO_x$.

11. The engine system of claim 10, further comprising the exhaust system, wherein the exhaust system comprises:
    a catalytic converter upstream from the SCR catalysts, wherein the catalytic converter produces ammonia and carbon monoxide while the engine is operating with the rich air/fuel ratios;
    the SCR catalysts, wherein the SCR catalysts are cascaded and downstream from the catalytic converter and absorb the ammonia;
    the oxidation catalyst, wherein the oxidation catalyst is an electrically heated catalyst; and
    a passive oxidation catalyst downstream from the electrically heated catalyst,
    wherein the electrically heated catalyst and the passive oxidation catalyst oxidize the carbon monoxide generated by the catalytic converter during the passive SCR mode.

12. The engine of claim 10, wherein the oxidation catalyst is downstream from the SCR catalysts.

13. A thermal management method comprising:
    enabling generation of ammonia for use in selective catalytic reduction (SCR) catalysts of an exhaust system during a passive SCR mode;
    determining whether the exhaust system is operating in a passive SCR mode and generates a passive SCR active signal, wherein the passive SCR mode includes operating an engine with rich air/fuel ratios, and wherein the passive SCR active signal indicates whether the exhaust system is operating in the passive SCR mode; and
    activating electrical heating of an oxidation catalyst downstream from the SCR catalysts based on the passive SCR active signal and a temperature of the oxidation catalyst,
    wherein the activation of the electrical heating of the oxidation catalyst is performed to increase the temperature of the oxidation catalyst to a temperature greater than or equal to a light-off temperature of the oxidation catalyst.

14. The thermal management method of claim 13, further comprising:
    determining levels of nitrogen oxide ($NO_x$) within the exhaust system;

generating an ammonia status signal based on the NO$_x$ levels; and enabling the passive SCR mode based on the ammonia status signal.

15. The thermal management method of claim 13, further comprising:

estimating ammonia levels within the SCR catalysts;

generating an ammonia status signal based on the ammonia levels; and enabling the passive SCR mode based on the ammonia status signal.

16. The thermal management method of claim 13, further comprising:

generating ammonia in the exhaust system by operating the engine with the rich air/fuel ratios based on an enable signal; and generating the enable signal based on at least one of nitrogen levels within the exhaust system and ammonia levels within the SCR catalysts.

17. The thermal management method of claim 16, further comprising switching between operating in a rich mode and operating in one of a lean mode and a stoichiometric mode when the passive SCR mode is active.

18. The thermal management method of claim 13, further comprising:

determining the temperature of the oxidation catalyst; and comparing the temperature of the oxidation catalyst with a predetermined threshold;

generating a comparison signal based on the comparison between temperature of the oxidation catalyst and the predetermined threshold; and activating electrical heating of the oxidation catalyst based on the comparison signal.

19. The thermal management method of claim 13, further comprising:

determining an active volume of the oxidation catalyst;

comparing the active volume of the oxidation catalyst with a predetermined threshold;

generating a comparison signal based on the comparison between the active volume of the oxidation catalyst and the predetermined threshold; and activating electrical heating of the oxidation catalyst based on the comparison signal.

20. The thermal management method of claim 13, further comprising activating electrical heating of the oxidation catalyst when the passive SCR mode is active and the temperature of the oxidation catalyst is less than a predetermined threshold.

* * * * *